(12) United States Patent
K et al.

(10) Patent No.: US 9,811,845 B2
(45) Date of Patent: Nov. 7, 2017

(54) SYSTEM FOR ACCELERATED PRICE MASTER DATABASE LOOKUP

(71) Applicants: Prajesh K, Mattanur (IN); Baris Yalcin, Muehlhausen (DE)

(72) Inventors: Prajesh K, Mattanur (IN); Baris Yalcin, Muehlhausen (DE)

(73) Assignee: SAP SE, Walldorf (DE)

( * ) Notice: Subject to any disclaimer, the term of this patent is extended or adjusted under 35 U.S.C. 154(b) by 1153 days.

(21) Appl. No.: 13/915,122

(22) Filed: Jun. 11, 2013

(65) Prior Publication Data

US 2014/0365401 A1    Dec. 11, 2014

(51) Int. Cl.
  *G06Q 30/00*    (2012.01)
  *G06Q 30/02*    (2012.01)
  *G06F 17/30*    (2006.01)

(52) U.S. Cl.
  CPC ... *G06Q 30/0283* (2013.01); *G06F 17/30442* (2013.01); *G06F 17/30528* (2013.01)

(58) Field of Classification Search
  CPC ............. G06C 30/0283; G06F 17/30442
  USPC ....... 705/400; 709/220; 703/6; 707/608, 705
  See application file for complete search history.

(56) References Cited

U.S. PATENT DOCUMENTS

| 5,745,746 | A | 4/1998 | Jhingran et al. |
| 5,960,420 | A | 9/1999 | Leymann et al. |
| 6,678,695 | B1 * | 1/2004 | Bonneau ........... G06F 17/30528 |
| 7,523,047 | B1 | 4/2009 | Neal et al. |
| 7,840,462 | B2 | 11/2010 | Hansen |
| 7,853,937 | B2 * | 12/2010 | Janczewski ............. G06F 8/314 |
| | | | 712/203 |
| 7,958,160 | B2 | 6/2011 | Ghosh et al. |
| 8,010,404 | B1 | 8/2011 | Wu et al. |
| 8,224,800 | B2 * | 7/2012 | Branscome ....... G06F 17/30442 |
| | | | 707/705 |
| 8,356,027 | B2 | 1/2013 | Jaecksch et al. |
| 8,374,997 | B2 | 2/2013 | Phibbs, Jr. et al. |
| 8,862,446 | B1 * | 10/2014 | Balasubramanian G06F 17/5077 |
| | | | 703/13 |
| 2002/0038450 | A1 | 3/2002 | Kloppmann et al. |

(Continued)

FOREIGN PATENT DOCUMENTS

JP    2012113517 A   *   6/2012

OTHER PUBLICATIONS

Feinberg, Donald and Edjlali, Roxane, "SAP HANA 1.0 Could Help Enterprises Realize Promise of In-Memory Technology" Jun. 28, 2011; 3 pages.*

(Continued)

*Primary Examiner* — Kevin Flynn
*Assistant Examiner* — Freda A Nelson
(74) *Attorney, Agent, or Firm* — Schwegman Lundberg & Woessner, P.A.

(57) ABSTRACT

A system generates a plurality of price master data lookup procedures that are capable of being executed in parallel. The plurality of price master data lookup procedures is stored in a repository in an in-memory system. The in-memory system includes a parallel processor. The system accesses the repository of price master data lookup procedures, and retrieves price master data in parallel using the price master data lookup procedures. The system then calculates a price using the price master data retrieved from the price master database in the in-system memory.

17 Claims, 4 Drawing Sheets

(56) References Cited

U.S. PATENT DOCUMENTS

| | | | |
|---|---|---|---|
| 2003/0014393 A1 | 1/2003 | Kabra et al. | |
| 2003/0023567 A1 | 1/2003 | Berkovitz et al. | |
| 2003/0182157 A1 | 9/2003 | Valk | |
| 2003/0187808 A1 | 10/2003 | Alfred | |
| 2004/0225664 A1* | 11/2004 | Casement | G06F 17/30557 |
| 2005/0120032 A1 | 6/2005 | Liebich et al. | |
| 2008/0097816 A1 | 4/2008 | Freire et al. | |
| 2012/0036089 A1* | 2/2012 | Washington | G06Q 10/10 |
| | | | 705/400 |
| 2012/0036231 A1* | 2/2012 | Thakur | H04L 45/00 |
| | | | 709/220 |
| 2013/0041789 A1 | 2/2013 | Klensch | |

OTHER PUBLICATIONS

Arnold, Arne and Brenckman, Ingo, "EIM201 Architecture and Technology in SAP HANA", 2012, 52 pages.*
"European Application Serial No. 14171854.4, Office Action dated May 5, 2015", 8 pgs.
Frick, Harald, "SQL/XML-IMDBg GPU boosted In-Memory Database for Ultra Fast Data Management", (Aug. 19, 2010), 46 pgs.
Murthy, Vasu, et al., "Oracle Exalytics In-Memory Machine: A Brief Introduction", An Oracle White Paper, (Jul. 2013), 18 pgs.
"European Application Serial No. 14171854.4, Office Action dated Oct. 1, 2015", 14 pgs.

* cited by examiner

SYSTEM FOR ACCELERATED PRICE MASTER DATABASE LOOKUP

TECHNICAL FIELD

The present disclosure relates to a system and method for an accelerated price master database lookup.

BACKGROUND

A major and resource-intensive step in price calculations in business transactions (e.g., order processing, invoicing) is an inquiry or lookup into a price master database. Depending upon the complexity of the price calculation rules (i.e., pricing schema or pricing procedure), during pricing many database lookups need to be made against price master database tables. These lookups could relate to prices, discounts, surcharges, taxes, etc. Usually, these look-ups take time, and because of that, the end user response time is degraded. In order to avoid this degradation in response time, pricing calculation applications usually cache the price master data in a shared memory of a system. However, caching price master data in shared memory consumes additional memory and increases the total cost of ownership (TCO), especially for large customers. Additionally, in order to manage such a cache (i.e., make sure that it is up-to-date with the price master database image), cache handlers have to employ additional services, which sometimes occupy many system resources (like work processes), and that make the system almost unusable for critical business processes.

DETAILED DESCRIPTION

Figure 1:
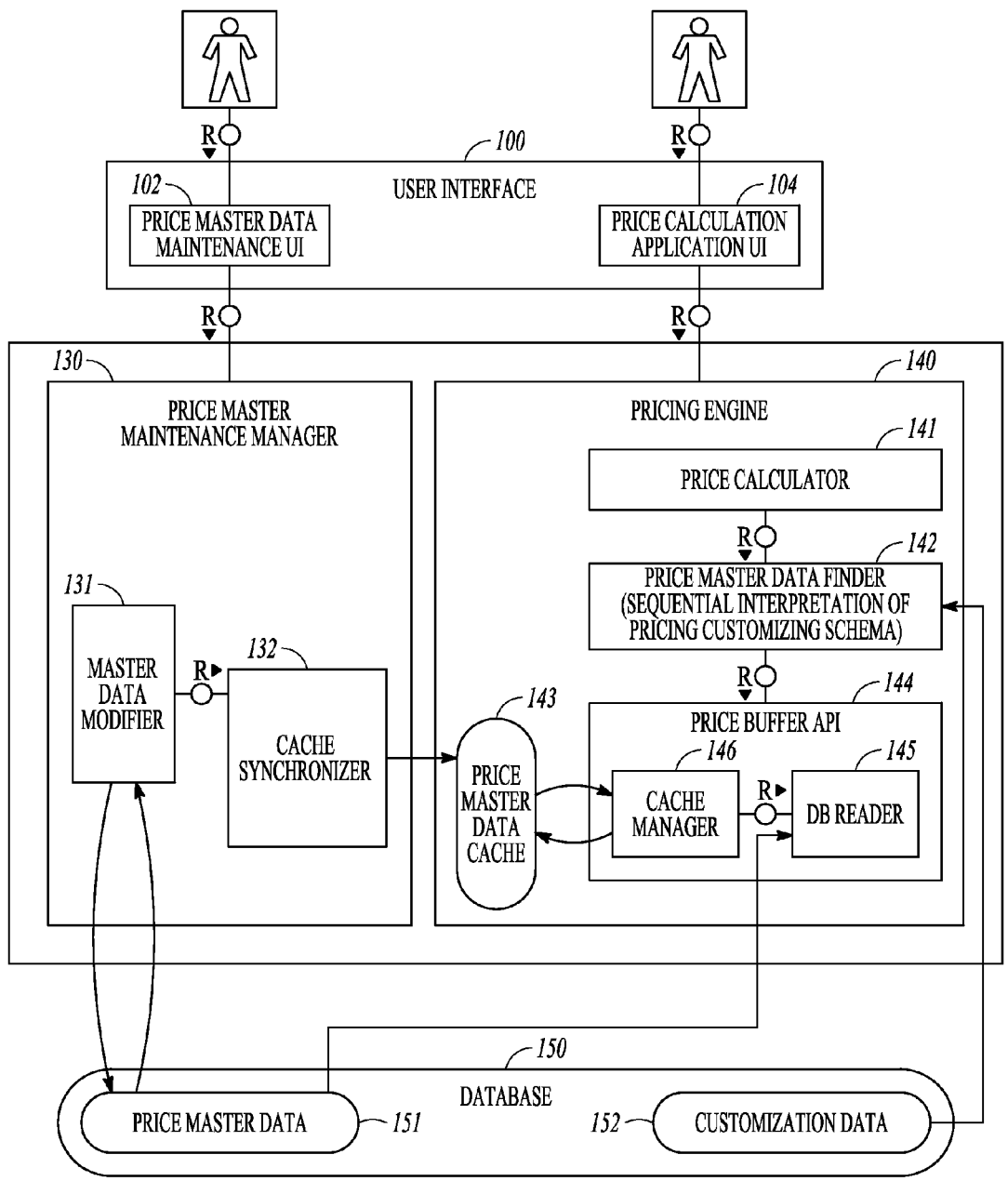
FIG. 1 is a block diagram illustrating an example embodiment of a system for price calculation.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

An embodiment of an accelerated price master database lookup is based on the independence of price master data. That is, many a time, the individual steps that are used in a price master data lookup in a price calculation rule (pricing schema or pricing procedure) are independent of each other. A sequential relation exists among such independent steps only during an actual price calculation (e.g., a discount can be calculated only after calculating the price). In an embodiment disclosed herein, this situation is exploited to accelerate the master data lookup in a price calculation in business transactions. The embodiment generates database procedures for price calculation rules so that each step of the calculation rules is a sub-step inside of the procedure. Each of these sub-steps can be represented by a sub-procedure that encapsulates all the associated lookups that correspond to that particular step. Since each step is independent of other steps, such procedures can be run in a highly parallelized environment of an in-memory database that supports such a parallelization. An example of such a database is the HANA® in-memory database system of SAP. With this approach, price master database look-ups are faster since they execute in parallel. This avoids the necessity to cache the look-up data results. Consequently, memory usage will be reduced, system stability will be improved, and response time will be improved. In another embodiment, the price master database lookup is further accelerated by grouping the same or similar tables (for multiple steps that may use the same look-up table), and doing a look-up using an array fetch option.

There are several advantages to such a system. It avoids memory usage that is involved with caching price master data, thereby reducing the total cost of ownership (TCO). It provides a faster response time during business transaction processing (i.e., order processing, invoicing, etc.). Since caching can be avoided, a highly complex cache management service is not needed. Such cache management services usually occupy system resources during high load context and affect system stability. For example, many records are fetched and put into cache, which causes cache overflow, which then requires a clean up of the cache. Additionally, as noted above, the cache has to mirror the price master database, but at times, data can be missing from the cache. When data is missing, the data has to be fetched again and put into cache. System resources are then occupied by these types of services, and this negatively affects the efficacy of the system to handle critical business processes. One or more embodiments of an accelerated price master data lookup avoid these situations.

Referring to FIG. 1, which is a block diagram of a price calculation system that uses cache technology, a user interface 100 includes a price master data maintenance user interface 102 and a price calculation user interface 104. The price master data maintenance user interface 102 permits a user to update, correct, modify, and generally maintain the price master data 151 in the database 150. This is accomplished via a connection with a master data modifier 131 of a price master maintenance manager 130.

The price calculation application user interface 104 permits a user to request a price calculation. The price calculation request is received by a pricing engine 140. The pricing engine 140 includes a price master data finder 142. The price master data finder 142 interprets in a sequential manner the pricing customizing schema that is being handled by the system. The price master data finder 142 also retrieves customized data 152 from the database 150. The price buffer application program interface (API) 144 obtains the pricing data needed for the price calculation from cache manager 146 and price master data cache 143, and the price calculator 141 uses this pricing data to calculate the price.

As noted above, the price master data cache 143 has to be kept up to date with the price master data 151. For example, when the master data modifier 131 executes an update of the price master data 151, it also has to update the price master data cache 143 via the cache synchronizer 132. When data has been changed in the price master data 151, the cache manager 146 uses the database reader 145 to retrieve the updated data from the price master data 151.

As further noted above, this process of maintaining the price master data cache 143 is resource intensive and slows the system response time. Specifically, it is evident from FIG. 1 that there is no parallelization ability and price master data have to be cached at an application server layer in order to meet key performance indicators (KPI). However, as noted, keeping the cache up-to-date requires synchronization activity, and that could, and usually does, result in inconsistencies between the price master database 151 and the price master data cache 143. Also, synchronization of the price master database 151 and the price master data cache 143 takes up application server resources (CPU and memory), especially when there is a mass update of price master data, which is not uncommon. In this context, each step in the price schema (customization object) has to be processed sequentially, and the pricing engine has to trigger structured query language (SQL) sequentially to find the price master data that correspond to each step in the pricing schema.

So, as is apparent from FIG. 1, in current price calculation systems, conditions that are required for different pricing procedures are determined sequentially. However, condition type accesses (between condition types) are normally independent of each other. Consequently, in an embodiment, a parallel condition determination is made at an item level using an in-memory database with parallelization capabilities.

Figure 2:
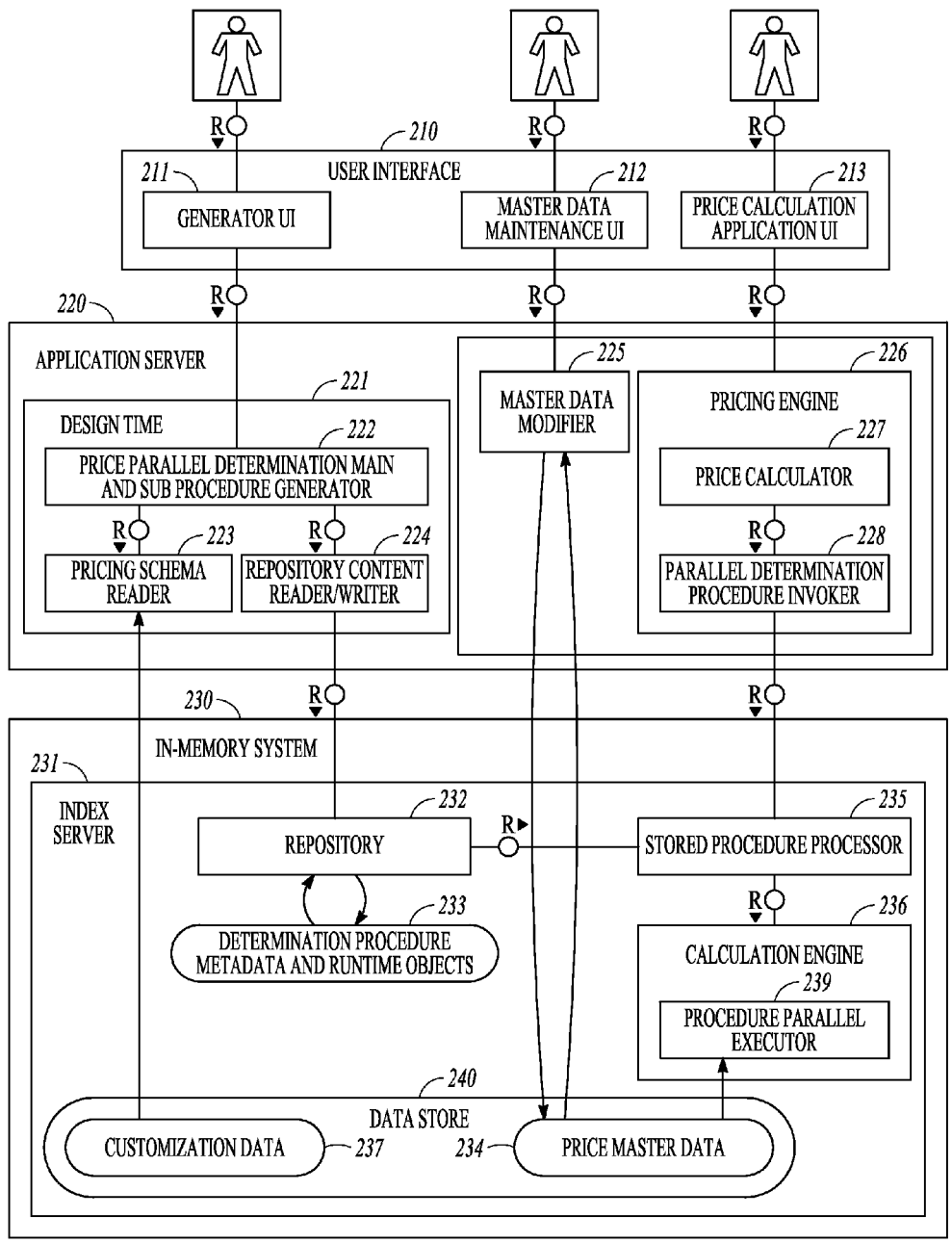
FIG. 2 is a block diagram illustrating an example embodiment of a system for accelerated price master database lookup.

FIG. 2 is a block diagram of a embodiment that implements a parallelization approach to price calculations using an in-memory database with parallelization capability. The system of FIG. 2 generates main and sub-procedures (design time activity), and stores correspondingly generated runtime objects in an in-memory repository catalog. Since these generated sub-procedures can be executed in parallel (using in-built capabilities of the in-memory database), a cache does not have to be maintained at the application server layer, and there is no more complexity caused by cache synchronization during price master data modification. Consequently, application server resources are saved and there is a better response time during price calculation due to the parallelization provided by a multi-core architecture of an in-memory database.

More specifically, FIG. 2 illustrates a user interface 210 that includes a generator user interface 211, a master data maintenance user interface 212, and a price calculation application user interface 213. An application server 220 is coupled to the user interface 210, and an in memory system 230 is coupled to the application server 220.

The application server includes a sub-procedure generator 222 processor that is within a design time module 221. The sub-procedure generator 222 is for generating a plurality of price master data lookup procedures that are capable of being executed in parallel. The sub-procedure generator 222 reads the pricing procedure customization module data base 237 via a pricing schema reader 223, which permits a user to determine the custom pricing information that is currently in the customization data store 237. The sub-procedure generator 222 stores a multitude of price master data lookup procedures in a repository 232 in an index server 231 of the in-memory system 230.

The application server 220 further includes a pricing engine processor 226, which includes a price calculator module 227 and a parallel determination procedure invoker 228. The application server 220 also includes a master data modifier module 225, which modifies data in the price master database 234 of the index server 231. The index server 231 includes a stored procedure processor 235. The stored procedure processor 235 communicates with the repository 232 and the calculation engine 236. The calculation engine 236 includes a procedure parallel processor 239, which can communicate in parallel with the price master database 234. The repository 232 of the index server 231 communicates with meta data and runtime objects 233. The runtime objects 233 are the executable price master database lookup procedures.

Figure 3:
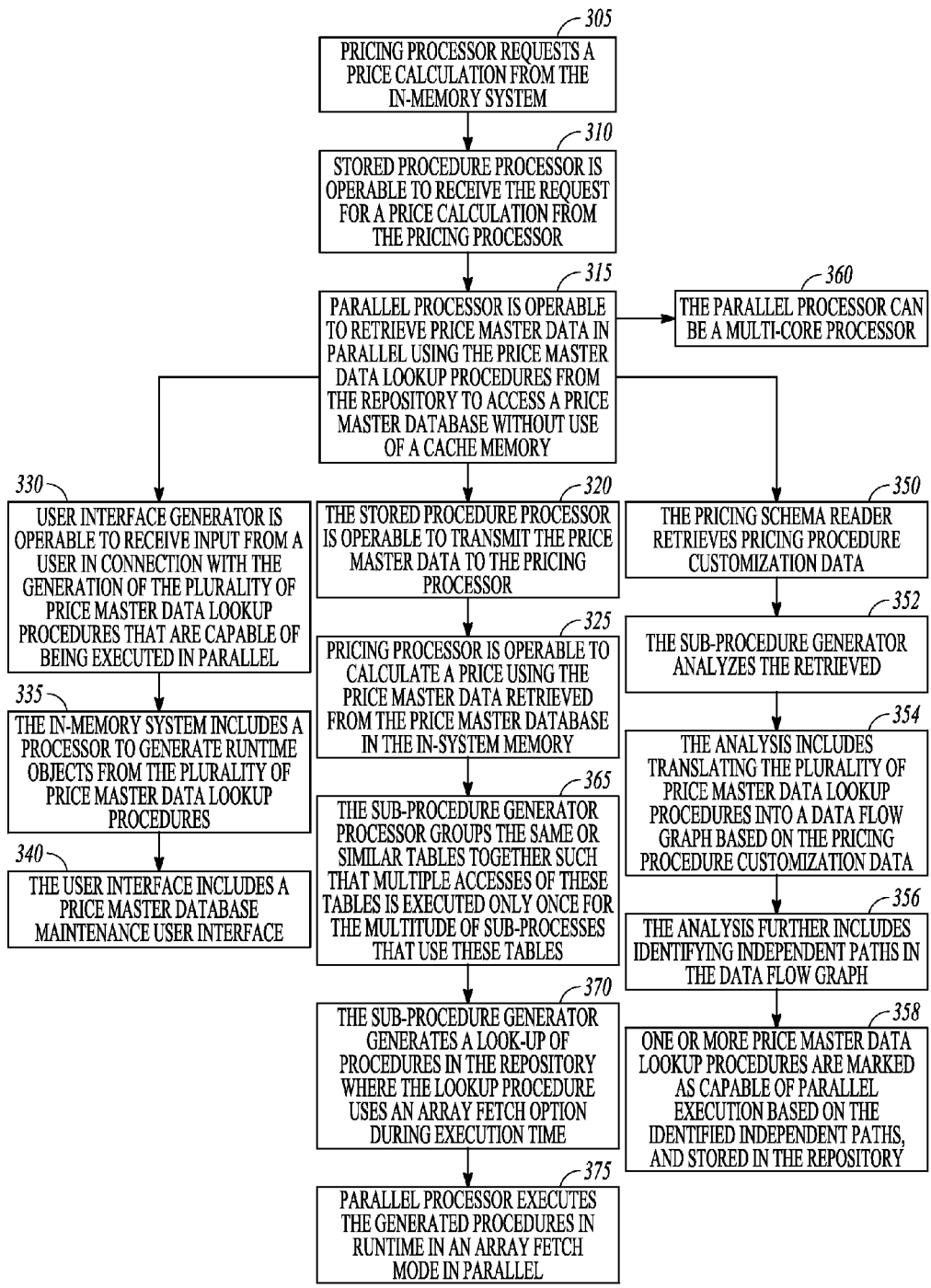
FIG. 3 is a block diagram illustrating features and steps of a system and method for an accelerated lookup of a price master database.

FIG. 3 is a block diagram of example operations and features of a system for price master database lookup. FIG. 3 includes a number of operation and feature blocks 305-375. Though arranged in both a branch and serial fashion in the example of FIG. 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

At 305, the pricing processor 226 requests a price calculation from the in-memory system 230. At 310, the stored procedure processor 235 is operable to receive the request for a price calculation from the pricing processor 226. The store procedure processor 235 is further operable to access the repository 232 of price master data lookup procedures, and to provide the price master data lookup procedures to the parallel processor 239. At 315, the parallel processor 239 is operable to retrieve price master data in parallel using the price master data lookup procedures from the repository 232 to access a price master database 234 without use of a cache memory. At 320, the stored procedure processor 235 is operable to transmit the price master data to the pricing processor 226. At 325, the pricing processor 226 is operable to calculate a price using the price master data retrieved from the price master database in the in-system memory 230.

As noted above, and again at 330, the user interface 210 includes a user interface generator 211. The user interface generator 211 is operable to receive input from a user in connection with the generation of the plurality of price master data lookup procedures that are capable of being executed in parallel. For example, the user interface generator 211 can receive a request to create procedures to generate a price. The pricing schema reader 223 retrieves data from the customization data store 237 for generating lookup procedures. The customized data can relate to for example a special discount for a particular customer. Using the retrieved data, the sub procedure generator 222 creates the sub procedures, and writes the sub procedures to the repository 232 via the repository content writer 224. At 335, it is noted that the in-memory system 230 includes a processor 233 to generate runtime objects from the plurality of price master data lookup procedures.

As further noted above, and also at 340, the user interface 210 can include a price master database maintenance user interface 212. As illustrated in FIG. 2, the price master database maintenance user interface 212 is coupled to the price master data store 234 in the in-memory system 230 via a price master data modifier processor 225 in the application server 220. The master data modifier 225 permits a user to create and/or modify price master data 234.

As further noted above, a multitude of price master data lookup procedures can be generated, and these price master data lookup procedures are capable of being executed in parallel. The details of generating the price master data lookup procedures that can be executed in parallel are illustrated in blocks 350-358. At 350, the pricing schema reader 223 retrieves pricing procedure customization data from the customization data store 237 to generate lookup procedures. At 352, the sub-procedure generator 222 analyzes the retrieved pricing procedure customization data. This analysis includes translating a plurality of price master data lookup procedures into a data flow graph based on the pricing procedure customization data at 354, and identifying independent paths in the data flow graph at 356. At 358, one or more price master data lookup procedures are marked as capable of parallel execution based on the identified independent paths. These marked price master data lookup procedures are then stored in the repository 232.

At 360, it is illustrated that the parallel processor can be a multi-core processor. At 365, it is noted that the sub-procedure generator processor 222 can be configured to group same or similar tables together such that multiple accesses of these tables is executed only once for the multitude of sub-processes that use these tables. For example, multiple steps in a pricing procedure can access the same table with different filter conditions. Consequently, procedures are generated such that the same table access across steps/condition types are combined with single query with an array fetch option. Then, independent table array fetch operations in a procedure will be parallelized. At 370, it is illustrated that the sub procedure generator 222 can be configured to generate look-up procedures in the repository 232 wherein the look-up procedure can use an array fetch option during execution time. At 375, parallel processor 239 executes the generated procedures during runtime in an array fetch mode in parallel. More specifically, special configuration is only required with the sub procedure generator 222. The sub procedure generator 222 does not execute the generated look-up procedure. Rather, the sub procedure generator 222 simply generates the program artifacts that can be executed in the in-memory system 230. The parallel processor 239 at a later time executes the generated look-up procedures during execution time in a parallel mode.

Figure 4:
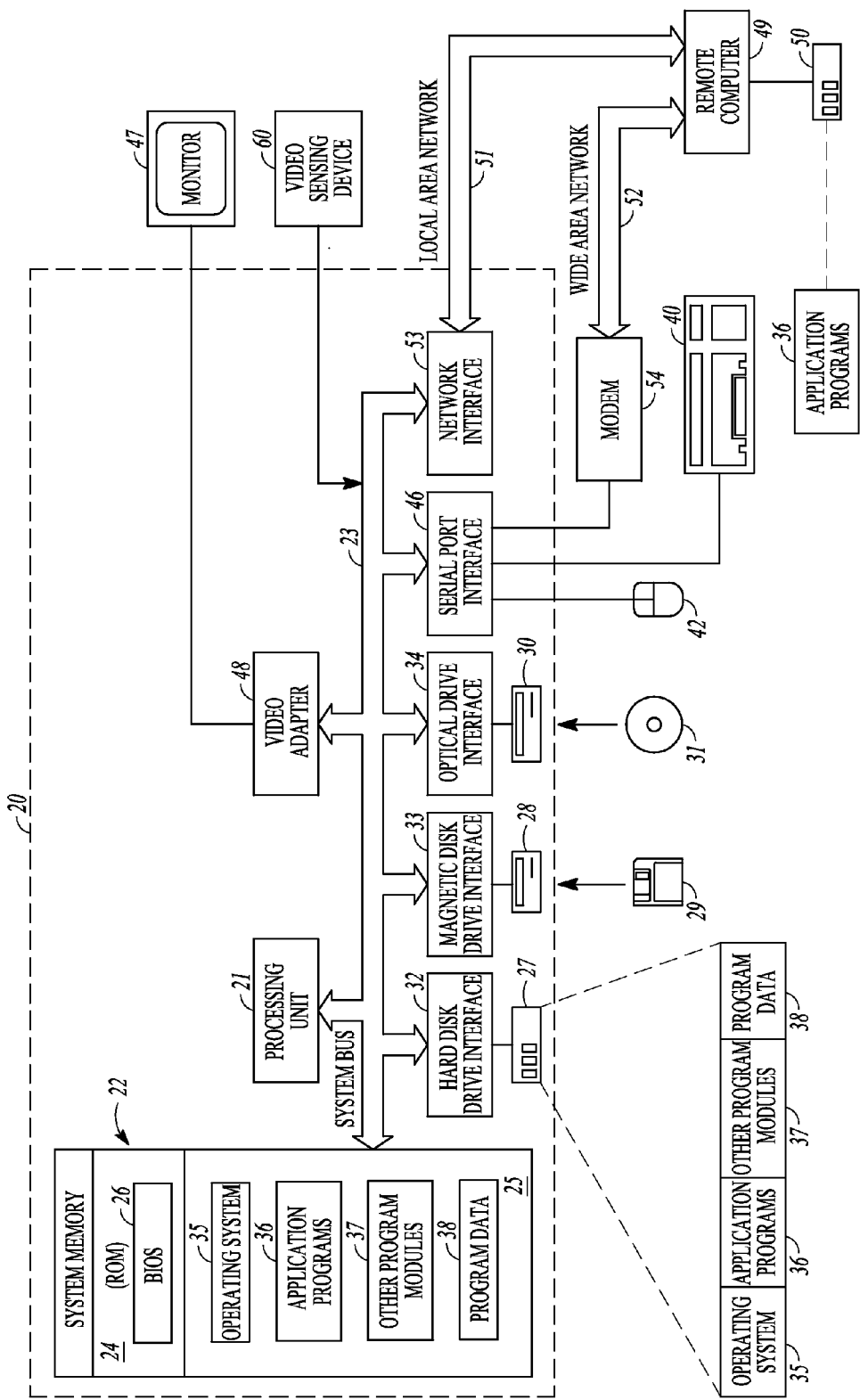
FIG. 4 is a block diagram of computer hardware that can be used in connection with the embodiments disclosed herein.

FIG. 4 is an overview diagram of hardware and an operating environment in conjunction with which embodiments of the invention may be practiced. The description of FIG. 4 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to any of the servers and/or remote clients shown in the other Figures. As shown in FIG. 4, one embodiment of the hardware and operating environment includes a general purpose computing device in the form of a computer 20 (e.g., a personal computer, workstation, controller, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 4 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
one or more user interface processors;
an application server coupled to the one or more user interface processors; and
an in-memory system coupled to the application server;
wherein the application server comprises a sub-procedure generator processor for generating a plurality of price master data lookup procedures that are capable of being executed in parallel and for storing the plurality of price master data lookup procedures in a repository in the in-memory system;
wherein the application server comprises a pricing processor;
wherein the in-memory system comprises a stored procedure processor and a parallel processor;
wherein the pricing processor is operable to request a price calculation from the in-memory system;
wherein the stored procedure processor is operable to receive the request for a price calculation from the pricing processor, to access the repository of price master data lookup procedures, and to provide the price master data lookup procedures to the parallel processor;
wherein the parallel processor is operable to retrieve price master data in parallel using the price master data lookup procedures to access a price master database without use of a cache memory;
wherein the stored procedure processor is operable to transmit the price master data to the pricing processor;
wherein the pricing processor is operable to calculate a price using the price master data retrieved from the price master database in the in-system memory; and
wherein the generation of the plurality of price master data lookup procedures that are capable of being executed in parallel comprises:
retrieving pricing customization data from a customization database in the in-memory system:
analyzing the pricing customization data;
translating the plurality of price master data lookup procedures into a data flow graph based on the pricing customization data;
identifying independent paths in the data flow graph; and
marking one or more price master data lookup procedures as capable of parallel execution based on the identified independent paths.

2. The system of claim 1, wherein the one or more user interface processors comprise a user interface generator, wherein the user interface generator is operable to receive input from a user in connection with the generation of the plurality of price master data lookup procedures that are capable of being executed in parallel.

3. The system of claim 2, wherein the in-memory system comprises a processor operable to generate runtime objects from the plurality of price master data lookup procedures.

4. The system of claim 1, wherein the one or more user interfaces comprise a price master database maintenance user interface, the price master database maintenance user interface coupled to the price master database in the in-memory system via a price master data modifier processor in the application server.

5. The system of claim 1, wherein the parallel processor comprises a multi-core processor.

6. The system of claim 1, wherein the sub-procedure generator processor is configured to group same or similar tables such that multiple accesses are capable of using a same look-up table.

7. The system of claim 1, wherein the price master data lookup procedures are executed using an array fetch option.

8. A system comprising:
an application server; and
an in-memory system coupled to the application server;
wherein the application server is operable to generate a plurality of price master data lookup procedures that are capable of being executed in parallel and to store the plurality of price master data lookup procedures in a repository in the in-memory system;
wherein the in-memory system comprises a parallel processor;
wherein the application server is operable to request a price calculation from the in-memory system;
wherein the in-memory system is operable to receive the request for a price calculation from the application server, to access the repository of price master data lookup procedures, and to provide the price master data lookup procedures to the parallel processor;
wherein the parallel processor is operable to retrieve price master data in parallel using the price master data lookup procedures to access a price master database;
wherein the in-memory system is operable to transmit the price master data to the pricing processor;
wherein the application server is operable to calculate a price using the price master data retrieved from the price master database in the in-system memory; and
wherein the generation of the plurality of price master data lookup procedures that are capable of being executed in parallel comprises:
retrieving pricing customization data from a customization database in the in-memory system;
analyzing the pricing customization data;
translating the plurality of price master data lookup procedures into a data flow graph based on the pricing customization data;
identifying independent paths in the data flow graph; and
marking one or more price master data lookup procedures as capable of parallel execution based on the identified independent paths.

9. The system of claim 8, wherein the parallel processor is operable to retrieve the price master data in parallel using the price master data lookup procedures without using a cache memory.

10. A non-transitory computer readable medium comprising instructions that when executed by a processor execute a process comprising:
generating a plurality of price master data lookup procedures that are capable of being executed in parallel;
storing the plurality of price master data lookup procedures in a repository in an in-memory system;
retrieving price master data in parallel using the price master data lookup procedures to access a price master database without use of a cache memory; and
calculating a price using the price master data retrieved from the price master database in the in-system memory;
wherein the generation of the plurality of price master data lookup procedures that are capable of being executed in parallel comprises:
retrieving pricing customization data from a customization database in the in-memory system;
analyzing the pricing customization data;
translating the plurality of price master data lookup procedures into a data flow graph based on the pricing customization data;
identifying independent paths in the data flow graph; and
marking one or more price master data lookup procedures as capable of parallel execution based on the identified independent paths.

11. The computer readable medium of claim 10, comprising instructions for receiving input from a user in connection with the generation of the plurality of price master data lookup procedures that are capable of being executed in parallel.

12. The computer readable medium of claim 11, wherein the in-memory system comprises instructions to generate runtime objects from the plurality of price master data lookup procedures.

13. The computer readable medium of claim 10, comprising instructions for retrieving the price master data in parallel in a multi-core processor.

14. The computer readable medium of claim 10, comprising instructions for grouping same or similar tables such that multiple accesses are capable of using a same look-up table.

15. The computer readable medium of claim 10, comprising instructions for executing a look-up using an array fetch option.

16. A system comprising:
a computer processor operable to:
generate a plurality of price master data lookup procedures that are capable of being executed in parallel;
store the plurality of price master data lookup procedures in a repository in an in-memory system, wherein the in-memory system comprises a parallel processor;
access the repository of price master data lookup procedures;
retrieve price master data in parallel using the price master data lookup procedures executing in the parallel processor to access a price master database; and
calculating a price using the price master data retrieved from the price master database in the in-system memory;
wherein the generation of the plurality of price master data lookup procedures that are capable of being executed in parallel comprises:
retrieving pricing customization data from a customization database in the in-memory system;
analyzing the pricing customization data;
translating the plurality of price master data lookup procedures into a data flow graph based on the pricing customization data;
identifying independent paths in the data flow graph; and
marking one or more price master data lookup procedures as capable of parallel execution based on the identified independent paths.

17. The system of claim 16, wherein the parallel processor is operable to retrieve the price master data in parallel using the price master data lookup procedures without using a cache memory.

* * * * *